United States Patent
Khanna et al.

(10) Patent No.: US 6,707,207 B1
(45) Date of Patent: Mar. 16, 2004

(54) HIGH BANDWIDTH TRACK FOLLOWING ACTUATOR FOR HARD DISK DRIVES

(75) Inventors: Vijayeshwar D. Khanna, Millwood, NY (US); Hien Dang, Nanuet, NY (US); Arun Sharma, New Rochelle, NY (US); Sri Sri-Jayantha, Ossining, NY (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 10/324,337

(22) Filed: Dec. 19, 2002

(51) Int. Cl.[7] ............................................... H02K 16/02
(52) U.S. Cl. ............... 310/156.37; 310/90; 310/156.32; 310/266; 310/268
(58) Field of Search .......... 310/156.32, 156.34–156.37, 310/266, 268, 90

(56) References Cited

U.S. PATENT DOCUMENTS

| | | | |
|---|---|---|---|
| 3,845,339 A | * 10/1974 | Merkle et al. | 310/156.34 |
| 3,953,751 A | * 4/1976 | Merkle et al. | 310/91 |
| 3,988,024 A | * 10/1976 | Watanabe et al. | 369/266 |
| 4,188,556 A | * 2/1980 | Hahn | 310/268 |
| 4,823,039 A | * 4/1989 | Lynch | 310/268 |
| 5,267,110 A | 11/1993 | Ottesen et al. | 360/106 |
| 5,289,069 A | * 2/1994 | Hasegawa et al. | 310/156.37 |
| 5,334,898 A | * 8/1994 | Skybyk | 310/268 |
| 5,440,185 A | * 8/1995 | Allwine, Jr. | 310/156.37 |
| 5,945,766 A | * 8/1999 | Kim et al. | 310/268 |
| 6,064,133 A | * 5/2000 | Kim et al. | 310/254 |
| 6,064,135 A | * 5/2000 | Hahn | 310/268 |
| 6,232,690 B1 | * 5/2001 | Schmider | 310/156.37 |
| 6,445,105 B1 | * 9/2002 | Kliman et al. | 310/268 |
| 6,455,969 B1 | * 9/2002 | Chen | 310/114 |
| 6,534,894 B1 | * 3/2003 | Flowerday | 310/268 |

FOREIGN PATENT DOCUMENTS

| | | | | |
|---|---|---|---|---|
| GB | 2360140 | * | 12/2001 | H02K/16/02 |
| JP | 63-209455 | * | 8/1988 | H02K/21/24 |
| JP | 4-295262 | * | 10/1992 | H02K/29/00 |
| JP | 8-275438 | * | 10/1996 | H02K/5/16 |
| JP | 11-206077 | * | 7/1999 | H02K/16/02 |

* cited by examiner

*Primary Examiner*—Burton Mullins
(74) *Attorney, Agent, or Firm*—Michael J. Buchenhorner

(57) ABSTRACT

A motor for incorporation in an actuator pivot includes a coil disk, an upper magnet-yoke disk, and a lower magnet-yoke disk. The coil disk is attached to the pivot shaft to form a shaft-coil assembly. The coil disk includes a plurality of coils, each placed orthogonally to the axis of the shaft. Each coil is configured to receive an electrical current in a first direction. A second coil located diametrically opposite to the first coil is configured to receive a second electrical current in a second direction so that the coils generate a torque with a net resultant linear force being substantially equal to zero. The first magnet-yoke disk, for mounting relative to the shaft at a location above the coil disk so that the first magnet-yoke disk rotates with respect to the coil disk, the magnet-yoke ring comprising at least one magnet, aligned in a first direction, and a respective plurality of yokes, each yoke for holding at least one magnet such that magnetic lines of flux are generated parallel to the axis. The second magnet-yoke disk is mounted relative to the shaft at a location below the coil disk so that the second magnet-yoke disk rotates with respect to the coil disk. The second magnet-yoke disk comprising a plurality of magnets, aligned in a direction opposite from the first direction, and a respective plurality of yokes, each yoke for holding a magnet such that magnetic lines of flux are generated parallel to the axis.

20 Claims, 3 Drawing Sheets

HIGH BANDWIDTH TRACK FOLLOWING ACTUATOR FOR HARD DISK DRIVES

FIELD OF THE INVENTION

The invention disclosed broadly relates to the field of hard disk drives, and more particularly, relates to the field of actuators for hard disk drives.

BACKGROUND OF THE INVENTION

Hard disk drive storage typically uses a multitude of rotating rigid disks for storage of data on a magnetic thin film on the disk surfaces. The stored data is written to or read from these disks by using transducer heads that are driven, by an actuator system, in a path towards and away from the center of the disks. The data is recorded in concentric circumferential tracks arrayed on the surfaces of the disks.

Today nearly all actuators, for positioning the transducer heads relative to the disk surfaces, are of the rotary variety. These rotary actuators typically include a pivotable support member and a comb assembly comprising of several closely spaced rigid arms. At least one transducer head is attached to each rigid arm. Typically, this comb assembly includes an extension, opposite in direction to the rigid arms, which is driven in a pivotal motion by a voice coil motor. The voice coil, cooperating with permanent magnets and the core assembly, is operatively controlled for moving the transducer heads in synchronism in a radial direction in order to position the heads with the data tracks to be followed.

As information storage devices having smaller physical sizes and larger storage capacity are required for information processing systems, there is a need for rotary actuator motors having more torque but consuming less power. The traditional approach is to use more powerful voice coil motors in the smaller sized designs. However, along with the increase in power there is a corresponding penalty in high bandwidth performance. This is due to a worsening of the bending modes of the actuator system. One approach to solving this problem is the use of a balanced mode of actuation. A rotary actuator utilizing a balanced configuration is discussed in U.S. Pat. No. 5,267,110 issued to Ottesen, et al.

One of the bending modes of the actuator system is the butterfly mode of bending for the main voice coil motor (VCM). It is a major limiting factor in achieving higher bandwidth servo for higher track densities. This butterfly mode has a 180 degree phase shift associated with it which is difficult to compensate by any electronic or filtering means. By the incorporation of a balanced configuration for the voice coil motor, used to perform the high bandwidth track following, one can sidestep the butterfly mode and associated phase shift of the typical VCM. The linear force that excites this butterfly mode is virtually eliminated in a balanced configuration.

A recent actuator motor design is disclosed in a co-pending patent application that is assigned to the assignee of the instant application. This application is titled "Disk Drive with a Pivot Embedded Torque Generating Track Following Actuator and Method Therefor," U.S. Ser. No. 09/877,012, and is hereby incorporated by reference herein. In this co-pending application is disclosed the use of a typical VCM motor to provide the high powered seek movement and the use of a balanced micro-VCM to provide the high bandwidth track following. The micro-VCM is embedded in the pivot of the actuator system.

SUMMARY OF THE INVENTION

Briefly, according to the invention, a micro-VCM motor for incorporation in an actuator pivot comprises (includes but is not limited to) a motor shaft, a coil disk, an upper magnet-yoke disk, a lower magnet-yoke disk and a motor housing. The coil disk is attached to the shaft to form a shaft-coil assembly.

The coil disk comprises two or more (a plurality of) coils. Each coil is placed orthogonally (perpendicular) to the axis of the shaft. One-half of the coils are configured to receive an electrical current in a first direction. The other half of the coils are each configured to receive a second electrical current in a second direction so that all the coils generate a torque in the same direction but with a net resultant linear force being substantially equal to zero. Each of the other half of the coils is located diametrically opposite to one of the coils receiving current in the opposite direction.

The upper magnet-yoke disk is mounted relative to the shaft at a location above the coil disk so that it rotates with respect to the coil disk. The upper magnet-yoke ring comprises at least one magnet, aligned in a first direction, and a respective number of yokes. Each yoke holds a magnet such that magnetic lines of flux are generated parallel to the motor shaft axis.

The lower magnet-yoke disk is mounted relative to the shaft at a location below the coil disk so that it rotates with respect to the coil disk. The lower magnet-yoke disk comprises at least one magnet aligned in a direction opposite from the direction of the magnet(s) of the upper magnet-coil disk, and a respective number of yokes to hold the magnet(s).

The upper and lower magnet-yoke disks are both fixed to a motor housing (outer sleeve) such that all three comprise the rotating part of the actuator pivot motor. The actuator comb assembly is, in turn, attached to this rotating part of the motor and will pivotally rotate with the same.

DESCRIPTION OF THE PREFERRED EMBODIMENT

Figure 1:
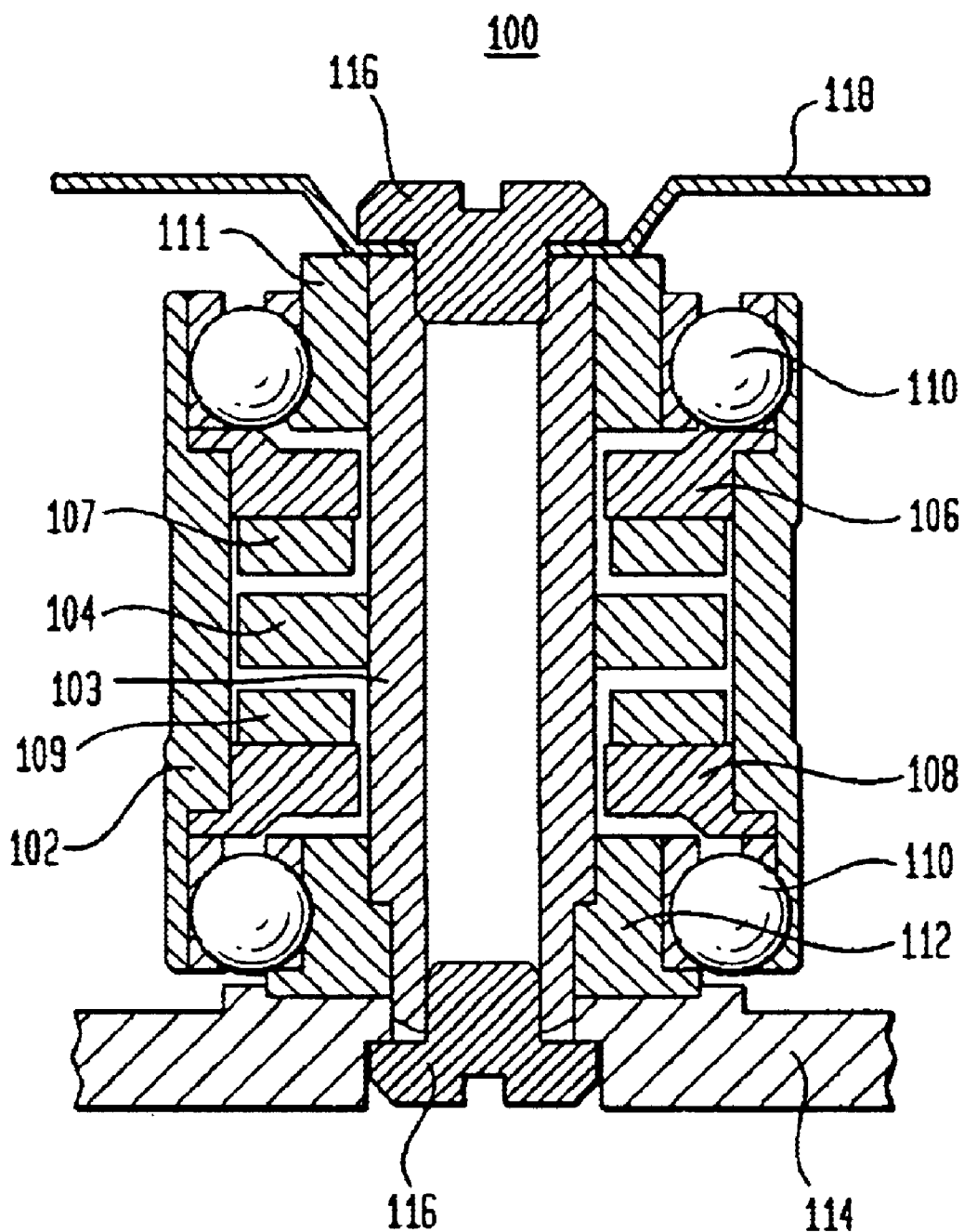
FIG. 1 is an illustration of a micro-VCM motor according to the present invention.

Referring to FIG. 1, there is shown a diagram of a cross-sectional view of a moving magnet micro-voice coil motor (VCM) 100 according to an embodiment of the invention. In a preferred embodiment the motor 100 is incorporated into the pivot of an actuator arm for a hard disk drive (HDD) mass storage system. The motor 100 comprises a bearing which comprises a housing (outer sleeve) 102 into which a shaft 103 and coil disk 104 assembly is first placed. Then two (respective upper and lower) yoke-magnet disk assemblies are inserted from the upper and lower ends thereof. These yoke-magnet disk assemblies respectively comprise upper magnets 107 and lower magnets 109 and upper yokes 106 and lower yokes 108 for holding their respective upper and lower magnets (107 and 109). Alternatively, the yokes 106 and 108 can each hold a single ring-shaped (or doughnut-shaped or toroidal) magnet having a single magnetic dipole or a plurality of magnetized areas such that magnetic flux lines are generated parallel to the vertical axis of the shaft 103. The yokes 106 and 108 are aligned such that the North-faced magnet(s) of one yoke (e.g., 106) face the South-faced magnets of the other (e.g., 108) or vise-versa.

In the preferred embodiment the coil disk 104 is attached to the shaft 103 such that no rotation of the coil disk 104 with respect to the shaft 103 is possible. However, that type of attachment is not necessary. It is sufficient that the upper and lower magnet-yoke assemblies be free to rotate with respect to the coil disk 104.

A set of upper and lower bearings 110 are then inserted from the two ends of the outer sleeve 102 to engage the shaft 103 at their inner diameter and the inside of the outer sleeve 102 on their outer diameter. The use of sleeves 111 and 112 may be made to fill up the space between the bearing inner diameter (for a standard bearing) and the shaft outer diameter. The use of a sleeve can be avoided by using special bearings in which the inner diameter is made to match the outer diameter of the shaft 103. Wires that carry current to the coil assembly 104 can be made to go through the shaft 103. It is known that the use of upper and lower inner sleeves allows the incorporation of a secondary feature that removes the problems associated with bearing stiction (i.e., the use of flexures). If the sleeves 111 and 112 have flexures built into them that allow very small but frictionless rotational motion the task of track-following servo is greatly improved. The shaft 103 is attached to the cover 118 and the base plate 114 of the disk drive with screws 116.

The "moving magnet micro-VCM" design according to an embodiment discussed herein is used to maximize the magnetic flux density by using the dual magnet/yoke arrangement described above. By doing so the flux density in the air gap is more uniform and can be increased to near the maximum attainable flux density by the magnetic material used. It is desirable to use the highest energy magnetic materials available to get the highest flux and thus the highest torque constant for the micro-VCM motor.

Figure 1A:
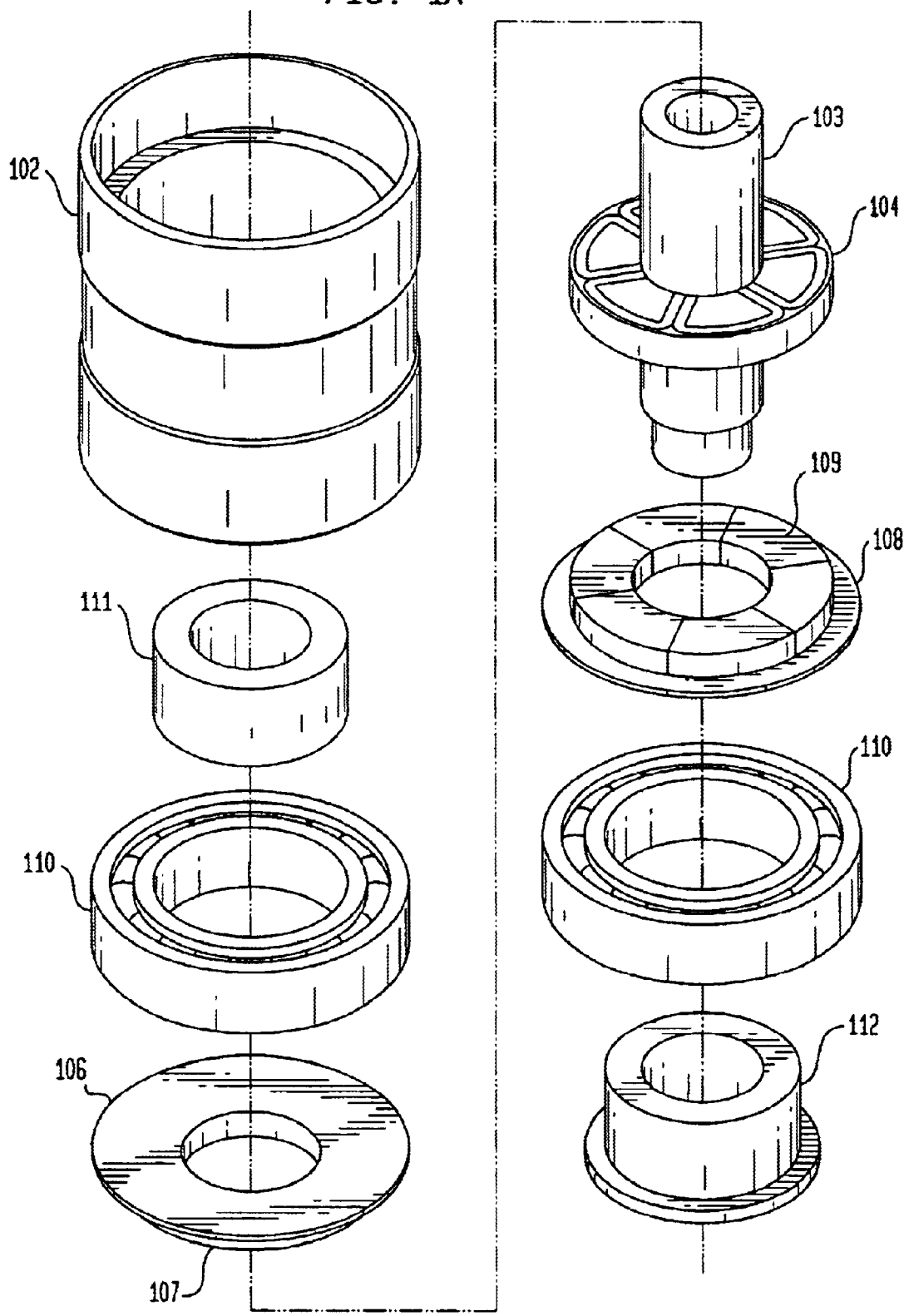
FIG. 1A shows an oblique view of several of the components for the motor shown in FIG. 1.
Figure 2:
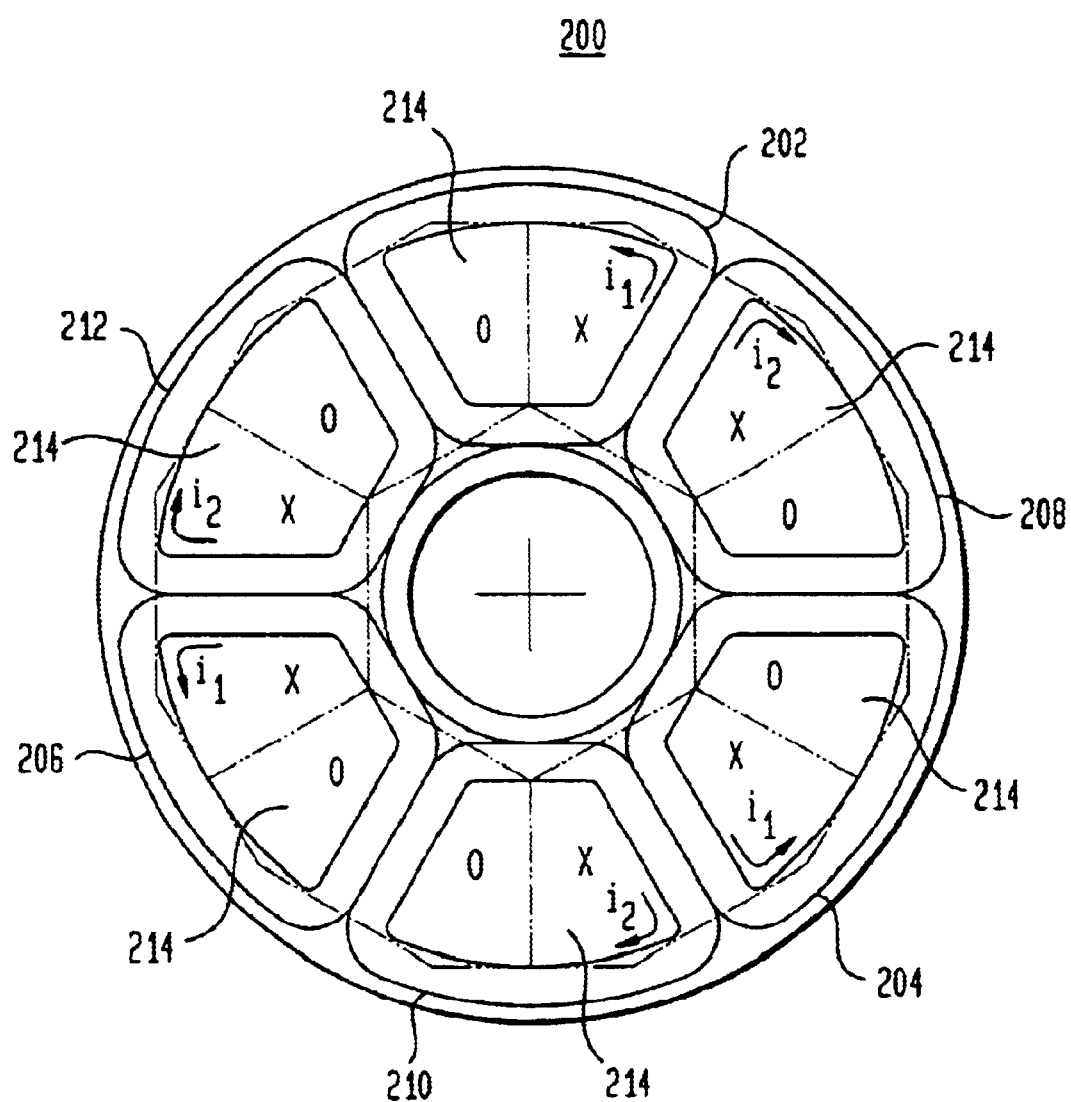
FIG. 2 shows a representation of a top view of a coil assembly according to the present invention.

The two yokes 106 and 108 are placed in a manner such that the magnetic lines of flux generated by magnet sets 107 and 109 are along the axis of the bearing, i.e., parallel to the bearing shaft 103. The coils 104 are therefore placed in a direction that is orthogonal to the direction of the lines of flux and are done so by making a shaft-coil assembly as shown in FIG. 2. FIG. 1A shows oblique views of several of the components of the motor 100.

Referring to FIG. 2, there is shown a top view of a coil disk assembly 200. according to an embodiment of the invention. The coil disk is shown juxtaposed with one of the magnet-yoke disk assemblies to show the relative positioning of the coils with respect to the magnets. The coil ring assembly 200 represents the preferred embodiment of the coil assembly 104 shown in FIG. 1. The coil disk assembly 200 comprises six coils 202–212 (this number can be changed to suit the design requirements). Coils 202, 204, and 206 are configured with a source of driving current (not shown) to receive an electrical current ($i_1$) that flows in the direction shown by the associated arrows. Coils 208, 210, and 212 are configured with the current source to receive a current ($i_2$) that flows in the direction opposite to that of $i_1$, as shown by the associated arrows. Each of the first set of coils is positioned in a location diametrically opposite from a corresponding coil in the second set. Any even number of coils can be used as long as they are a diametrically opposite pair, each coil receiving the driving current in an opposite direction from the other and are configured to receive electrical currents so that the coils generate a torque in the same direction with a net resultant linear force being substantially equal to zero. By way of example, note that coil 202 is located at a position that is diametrically opposite to that of coil 210 which carries current in the opposite direction.

FIG. 2 illustrates the direction of the flux as parallel to the axis of the motor shaft 103. Thus, in each coil there is shown a plurality of either "O"s (representing a flux flow in an upward direction from the plane of the page) or a plurality of "X"s (representing a flux flow in a downward direction into the plane of the page).

FIG. 2 also shows the position of magnets 214 with respect to the coils 202–212. As noted above these two elements are in a rotating relation with respect to each other and thus the positions shown will vary instantaneously during operation of the motor 100. The rotation results from the flow of current through coils 202–212.

In the coil ring assembly 200 each coil is individually wound (the wires are parallel to the plane of the page) and then six of these are encapsulated into a disk using an appropriate material (in a preferred embodiment, epoxy is used). This disk is then attached to the shaft to make the assembly shown in FIG. 1. It may also be possible to make the coil assembly by a lithography process wherein the round coil assembly is deposited (or selectively etched) onto a thin Kapton-like material to create one layer of the assembly and many more layers are added on top to achieve the required number of coil turns. This multi-layered structure is then cured to harden it into a rigid disk which is then attached to the shaft 103.

Therefore, while there has been described what is presently considered to include the preferred embodiment, it will be understood by those skilled in the art that other modifications can be made within the spirit and scope of the invention.

We claim:

1. A motor for incorporation in a pivot of an actuator, having a shaft defining a vertical axis along its length, comprising:

a coil disk, for mounting on the shaft, the coil disk comprising a plurality of coils each placed orthogonally to the axis of the shaft; the plurality of coils comprising at least one coil configured to receive an electrical current in a first direction and a second coil located diametrically opposite to the first coil and configured to receive a second electrical current in a second direction so that the coils generate a torque with a net resultant linear force being substantially equal to zero;

a first magnet-yoke disk, for mounting relative to the shaft at a location above the coil disk so that the first magnet-yoke disk rotates with respect to the coil disk, the magnet-yoke ring comprising at least one magnet, aligned in a first orientation, and a respective number of yokes, each yoke for holding at least one magnet such that magnetic lines of flux are generated parallel to the axis;

a second magnet-yoke disk, for mounting relative to the shaft at a location below the coil disk so that the second magnet-yoke disk rotates with respect to the coil disk, the second magnet-yoke disk comprising at least one magnet, aligned in an orientation opposite from the first orientation, and a respective number of yokes, each yoke for holding at least one magnet such that magnetic lines of flux are generated parallel to the axis in a direction opposite to the first orientation.

2. The motor of claim 1, wherein the coil disk comprises an even number of coils, of which half of the coils are adapted to receive a driving current in a first direction and another half of the coils are adapted to receive a driving current in a second direction and wherein each of the coils receiving a current in the first direction is located in a diametrically opposite location from a corresponding coil receiving a current in the second direction.

3. The motor of claim 2, wherein the coil disk comprises six coils, of which three are adapted to receive a driving current in the first direction and three are adapted to receive a driving current in a second direction.

4. The motor of claim 1 further comprising a sleeve for holding the coil disk, the first magnet-yoke disk, and the second magnet-yoke disk.

5. The motor of claim 4 further comprising a set of upper and lower bearings inserted from the two ends of the sleeve to engage the shaft at their inner diameter and the inside of the outer sleeve on their outer diameter.

6. The motor of claim 5 further comprising upper and lower inner sleeves placed so as to fill a space between the bearing inner diameter and the shaft outer diameter.

7. The motor of claim 1 wherein the coil disk is attached to the shaft in a non-rotating relationship.

8. The motor of claim 3 wherein the coils are encapsulated into a disk using an appropriate material.

9. The motor of claim 8 wherein the appropriate material is hardened epoxy.

10. The motor of claim 3 wherein the coil assembly is deposited to create a coil assembly.

11. A hard disk drive comprising a motor for incorporation in a pivot of an actuator having a shaft defining a vertical axis along its length, the motor comprising:

a coil disk, for mounting on the shaft, the coil disk comprising a plurality of coils each placed orthogonally to the axis of the shaft; the plurality of coils comprising at least one coil configured to receive an electrical current in a first direction and a second coil located diametrically opposite to the first coil and configured to receive a second electrical current in a second direction so that the coils generate a torque with a net resultant linear force being substantially equal to zero;

a first magnet-yoke disk, for mounting relative to the shaft at a location above the coil disk so that the first magnet-yoke disk rotates with respect to the coil disk, the magnet-yoke ring comprising at least one magnet, aligned in a first orientation, and a respective number of yokes, each yoke for holding at least one magnet such that magnetic lines of flux are generated parallel to the axis;

a second magnet-yoke disk, for mounting relative to the shaft at a location below the coil disk so that the second magnet-yoke disk rotates with respect to the coil disk, the second magnet-yoke disk comprising at least one magnet, aligned in an orientation opposite from the first orientation, and a respective number of yokes, each yoke for holding at least one magnet such that magnetic lines of flux are generated parallel to the axis in a direction opposite to the first orientation.

12. The hard disk drive of claim 11, wherein the coil disk comprises an even number of coils, of which half of the coils are adapted to receive a driving current in a first direction and another half of the coils are adapted to receive a driving current in a second direction and wherein each of the coils receiving a current in the first direction is located in a diametrically opposite location from a corresponding coil receiving a current in the second direction.

13. The hard disk drive of claim 12, wherein the coil disk comprises six coils, of which three are adapted to receive a driving current in the first direction and three are adapted to receive a driving current in a second direction.

14. The hard disk drive of claim 11, further comprising a sleeve for holding the coil disk, the first magnet-yoke disk, and the second magnet-yoke disk.

15. The hard disk drive of claim 14, further comprising set of upper and lower bearings inserted from the two ends of the sleeve to engage the shaft at their inner diameter and the inside of the outer sleeve on their outer diameter.

16. The hard disk drive of claim 15, further comprising upper and lower inner sleeves placed so as to fill a space between the bearing inner diameter and the shaft outer diameter.

17. The hard disk drive of claim 1, wherein the coil disk is attached to the shaft in a non-rotating relationship.

18. A method for assembling a motor for incorporation in a pivot of an actuator, comprising:

inserting a coil disk-shaft assembly into an outer sleeve, the coil disk comprising a plurality of coils each placed orthogonally to the axis of the shaft; the plurality of coils comprising at least one coil configured to receive an electrical current in a first direction and a second coil located diametrically opposite to the first coil and configured to receive a second electrical current in a second direction so that the coils generate a torque with a net resultant linear force being substantially equal to zero;

inserting an upper magnet-yoke disk into the outer sleeve and mounting the upper magnet-yoke disk relative to the shaft at a location above the coil disk-shaft assembly so that the first magnet-yoke disk rotates with respect to the coil disk, the magnet-yoke ring comprising at least one magnet, aligned in a first orientation, and a respective number of yokes, each yoke for holding at least one magnet such that magnetic lines of flux are generated parallel to the axis;

inserting a lower magnet-yoke disk into the outer sleeve and mounting the lower magnet-yoke disk relative to the shaft at a location below the coil disk-shaft assembly so that the lower magnet-yoke disk rotates with respect to the coil disk-shaft assembly, the lower magnet-yoke disk comprising at least one magnet, aligned in an orientation opposite from the first orientation, and a respective number of yokes, each yoke for holding at least one magnet such that magnetic lines of flux are generated parallel to the axis in a direction opposite to the first orientation.

19. The method of claim 18 farther comprising a step of inserting upper and lower bearings from the two ends of the sleeve to engage the shaft at their inner diameter and the inside of the outer sleeve on their outer diameter.

20. The method of claim 18 further comprising the step of inserting upper and lower inner sleeves into the outer sleeve so as to fill a space between the bearing inner diameter and the shaft outer diameter.

* * * * *